United States Patent
Tschirhart et al.

(10) Patent No.: US 10,554,138 B2
(45) Date of Patent: Feb. 4, 2020

(54) FLUX LIMITED FAST TRANSIENT RESPONSE IN ISOLATED DC-DC CONVERTERS

(71) Applicant: Infineon Technologies Austria AG, Villach (AT)

(72) Inventors: Darryl Tschirhart, Torrance, CA (US); Amir Babazadeh, Laguna Hills, CA (US)

(73) Assignee: Infineon Technologies Austria AG, Villach (AT)

( * ) Notice: Subject to any disclaimer, the term of this patent is extended or adjusted under 35 U.S.C. 154(b) by 303 days.

(21) Appl. No.: 15/333,368

(22) Filed: Oct. 25, 2016

(65) Prior Publication Data

US 2018/0115251 A1    Apr. 26, 2018

(51) Int. Cl.
H02M 3/335    (2006.01)
H02M 1/32    (2007.01)

(52) U.S. Cl.
CPC ......... H02M 3/33592 (2013.01); H02M 1/32 (2013.01)

(58) Field of Classification Search
CPC combination set(s) only.
See application file for complete search history.

(56) References Cited

U.S. PATENT DOCUMENTS 5,081,570 A    1/1992 Chibani et al.
5,406,468 A    4/1995 Booth
(Continued)

FOREIGN PATENT DOCUMENTS

CN    101005242 A    7/2007
CN    201219239 Y    4/2009
(Continued)

OTHER PUBLICATIONS

Ortiz, G. et al., "'Magnetic Ear'-Based Balancing of Magnetic Flux 1 n High Power Medium Frequency Dual Active Bridge Converte Transformer Cores", 8th International Conference on Power Electronics—ECCE Asia, The Shilla Jeju, Korea, May 30-Jun. 3, 2011, pp. 1307-1314.
(Continued)

Primary Examiner — Gary L Laxton
Assistant Examiner — Ivan Laboy
(74) Attorney, Agent, or Firm — Murphy, Bilak & Homiller, PLLC

(57) ABSTRACT

A method of controlling an isolated DC-DC converter includes switching the primary side switching devices of the converter at a fixed first switching period and variable duty cycle during non-transient load conditions so as to transfer energy across the transformer of the converter during first energy transfer intervals separated by energy circulation intervals, such that the ratio of each first energy transfer interval to the first switching period is less than unity. The method also includes switching the primary side switching devices at a second switching period different than the first switching period during a transient load condition so as to transfer energy across the transformer during second energy transfer intervals of a duration determined so as to avoid saturation of the transformer core, and such that any energy circulation interval separating the second energy transfer intervals is shorter than the energy circulation intervals separating the first energy transfer intervals.

41 Claims, 8 Drawing Sheets

(56) References Cited

U.S. PATENT DOCUMENTS

| | | | |
|---|---|---|---|
| 5,978,238 A | 11/1999 | Liu | |
| 6,191,964 B1 | 2/2001 | Boylan et al. | |
| 7,880,577 B1 | 2/2011 | De Rooij et al. | |
| 8,416,597 B2 | 4/2013 | Adragna et al. | |
| 8,456,867 B1* | 6/2013 | Karlsson | H02M 1/36 323/901 |
| 8,526,204 B2 | 9/2013 | Goto et al. | |
| 8,976,543 B1 | 3/2015 | Gregory et al. | |
| 9,083,255 B2 | 7/2015 | Duan et al. | |
| 9,166,481 B1 | 10/2015 | Vinciarelli et al. | |
| 9,252,672 B2 | 2/2016 | Leung et al. | |
| 9,379,628 B2 | 6/2016 | Zambetti et al. | |
| 9,680,386 B2 | 6/2017 | Xie et al. | |
| 9,825,546 B2 | 11/2017 | Bernacchia et al. | |
| 2005/0105237 A1 | 5/2005 | D'Amato et al. | |
| 2009/0279331 A1 | 11/2009 | Young et al. | |
| 2011/0157927 A1 | 6/2011 | Adragna et al. | |
| 2011/0194206 A1 | 8/2011 | Sase et al. | |
| 2011/0299304 A1* | 12/2011 | Coley | H02M 1/40 363/21.09 |
| 2013/0166493 A1 | 6/2013 | Dong et al. | |
| 2013/0308344 A1 | 11/2013 | Rosado et al. | |
| 2014/0043860 A1* | 2/2014 | Luh | H02M 1/40 363/17 |
| 2014/0185328 A1* | 7/2014 | Rosado | H02M 1/40 363/17 |
| 2014/0192560 A1* | 7/2014 | Ou | H02M 1/40 363/16 |
| 2014/0218973 A1* | 8/2014 | Popovici | H02M 3/33569 363/17 |
| 2014/0266123 A1 | 9/2014 | Rader | |
| 2015/0003116 A1* | 1/2015 | Karlsson | H02M 3/33538 363/17 |
| 2015/0103565 A1 | 4/2015 | Shimamori et al. | |
| 2015/0333634 A1* | 11/2015 | Yoshida | H02M 3/33576 363/21.03 |
| 2015/0365005 A1* | 12/2015 | Panov | H02M 3/33584 307/24 |
| 2016/0079878 A1 | 3/2016 | Yu et al. | |
| 2016/0094134 A1 | 3/2016 | Iyasu et al. | |
| 2016/0285377 A1* | 9/2016 | Takagi | H02M 3/33546 |
| 2016/0372927 A1 | 12/2016 | Dent et al. | |
| 2017/0025962 A1 | 1/2017 | Davidson et al. | |
| 2017/0063251 A1 | 3/2017 | Ye et al. | |
| 2017/0163159 A1 | 6/2017 | Tschirhart et al. | |

FOREIGN PATENT DOCUMENTS

| | | |
|---|---|---|
| CN | 101677212 A | 3/2010 |
| CN | 101689811 A | 3/2010 |
| CN | 102570782 A | 7/2012 |
| CN | 104160604 A | 11/2014 |
| DE | 19634713 A1 | 3/1997 |

OTHER PUBLICATIONS

Ortiz, Gabriel et al., "Flux Balancing of Isolation Transformers and Application of "The Magnetic Ear"for Closed-Loop Volt-Second Compensation", IEEE Transactions on Power Electronics, vol. 29, No. 8, Aug. 2014, pp. 4078-4090.

Tschirhart, Darryl et al., "Transformer Flux Estimation and Limiting in Isolated DC-DC Voltage Converters", U.S. Appl. No. 15/235,872, filed Aug. 12, 2016.

Cheung, Victor Sui-Pung et al., "Capacitor Current Programming Technique for Phase-Shift DC-DC Converter", 2011 IEEE Energy Conversion Congress and Exposition (ECCE), Sep. 17-22, 2011, pp. 1251-1258.

Mappus, Stev, "Current Doubler Rectifier Offers Ripple Current Cancellation", TI Application Note, System Power, SLUA 323, Sep. 2004.

Oggier, Germán G. et al., "Boundary Control of Full-Bridge ZVS: Natural Switching Surface for Transient and Steady-State Operation", IEEE Transactions on Industrial Electronics, vol. 61, No. 2, Feb. 2014, pp. 969-979.

Shi, Hongliang et al., "Dynamic Physical Limits of a Phase-Shifted Full Bridge Circuit for Power Supply of Magnetic Resonance Imaging Gradient Amplifiers", 41st Annual Conference of the IEEE, Industrial Electronics Society, IECON 2015, Nov. 9-12, 2015, pp. 4900-4904.

Park, Hwa-Pyeong, et al., "Design Considerations of Resonant Network and Transformer Magnetics for High Frequency LLC Resonant Converter", Journal of Electrical Engineering and Technology, vol. 11, Issue 2, Nov. 2, 2016, pp. 383-392.

* cited by examiner

FLUX LIMITED FAST TRANSIENT RESPONSE IN ISOLATED DC-DC CONVERTERS

TECHNICAL FIELD

The present application relates to isolated DC-DC converters and, in particular, relates to techniques for avoiding transformer core saturation in DC-DC converters during transient load conditions.

BACKGROUND

In non-isolated DC-DC converters such as the buck converter, an optimal transient load condition response may be achieved by proper timing of the high-side and low-side transistors so as to balance the charge on the output capacitor of the converter. Such an approach achieves the minimum undershoot possible for a given design. In isolated topologies such as full-bridges and half-bridges where the primary side of the converter is coupled to the secondary side by a transformer, transformer core saturation prevents direct application of the non-isolated approach mentioned above. With linear control loops, transformer core saturation during transient load conditions is conventionally avoided by over-sizing the transformer core and assuming a maximum duty cycle may be applied at the minimum input voltage. Alternatively, the maximum duty cycle is limited as a function of the input voltage which degrades transient response. In either case, a more optimal response that avoids transformer core saturation in isolated DC-DC converters without increasing the size or cost of the converter is desired.

SUMMARY

According to an embodiment of a method of controlling an isolated DC-DC converter that includes primary side switching devices coupled to secondary side rectifying devices by a transformer having a core, the method comprises: switching the primary side switching devices at a fixed first switching period and variable duty cycle during non-transient load conditions so as to transfer energy across the transformer during first energy transfer intervals separated by energy circulation intervals, such that the ratio of each first energy transfer interval to the first switching period is less than unity; and switching the primary side switching devices at a second switching period different than the first switching period during a transient load condition so as to transfer energy across the transformer during second energy transfer intervals of a duration determined so as to avoid saturation of the transformer core, and such that any energy circulation interval separating the second energy transfer intervals is shorter than the energy circulation intervals separating the first energy transfer intervals.

According to an embodiment of an isolated DC-DC converter, the converter comprises: primary side switching devices; secondary side rectifying devices; a transformer having a core, the transformer coupling the primary side switching devices to the secondary side rectifying devices; and a controller. The controller is operable to switch the primary side switching devices at a fixed first switching period and variable duty cycle during non-transient load conditions so as to transfer energy across the transformer during first energy transfer intervals separated by energy circulation intervals, such that the ratio of each first energy transfer interval to the first switching period is less than unity. The controller is further operable to switch the primary side switching devices at a second switching period different than the first switching period during a transient load condition so as to transfer energy across the transformer during second energy transfer intervals of a duration determined so as to avoid saturation of the transformer core, and such that any energy circulation interval separating the second energy transfer intervals is shorter than the energy circulation intervals separating the first energy transfer intervals.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments may be combined unless they exclude each other. Embodiments are depicted in the drawings and are detailed in the description that follows.

DETAILED DESCRIPTION

The embodiments described herein provide techniques for avoiding transformer core saturation in isolated DC-DC voltage converters. These techniques allow transformer miniaturization without degraded transient performance, by maintaining limited volt-seconds (V-s) across the transformer without linear loop constraints on switching frequency. During non-transient load conditions, the primary side switching devices of an isolated DC-DC voltage converter are switched at a fixed first switching period and variable duty cycle so as to transfer energy across the transformer during first energy transfer intervals separated by energy circulation intervals, such that the ratio of each first energy transfer interval to the first switching period is less than unity. During transient load conditions in which an instantaneous or near instantaneous change in load current occurs, the primary side switching devices of the isolated DC-DC voltage converter are switched at a second switching period different than the first switching period so as to transfer energy across the transformer during second energy transfer intervals of a duration determined so as to avoid saturation of the transformer core, and such that any energy circulation interval separating the second energy transfer intervals is shorter than the energy circulation intervals separating the first energy transfer intervals.

With this approach, the primary side switching devices create an effective constant ramp current up to a peak value, followed by an off time during which the primary side switching devices are turned off and the rectifiers on the secondary side may be off or on. This approach may be employed with various types of isolated DC-DC voltage converters, including half-bridge with PWM control and full-bridge with PWM control and phase-shift control, and achieves fast transient response without saturating the transformer core and without overdesigning the transformer. Also described herein are various embodiments for entering and exiting the transient mode of operation.

Various embodiments of isolated DC-DC voltage converters and control methods for isolated DC-DC voltage converters are provided in the following detailed description and the associated figures. The described embodiments provide particular examples for purposes of explanation, and are not meant to be limiting. Features and aspects from the example embodiments may be combined or re-arranged, except where the context does not allow this.

Figure 1:
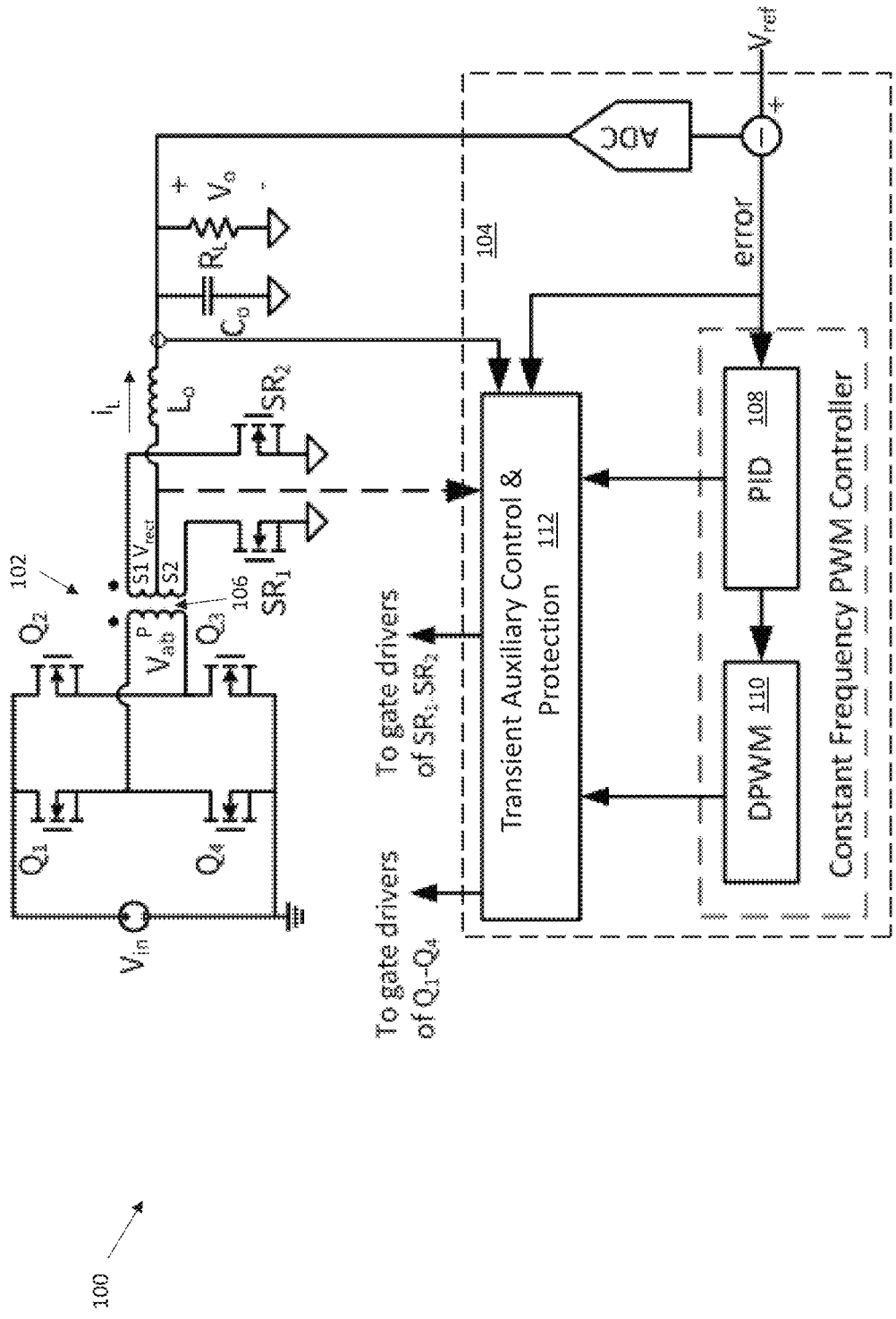
FIG. 1 illustrates a schematic diagram of an isolated DC-DC voltage converter.

FIG. 1 illustrates an embodiment of an isolated DC-DC voltage converter 100 within which flux limited fast transient response may be implemented. The illustrated isolated DC-DC voltage converter 100 has a center-tap rectifier configuration, but the techniques described herein also apply to other rectifier topologies such as the full-wave rectifier which is a full-bridge configuration that uses the same signals as the center-tap configuration. The isolated DC-DC voltage converter 100 has a primary side which includes primary side switching devices $Q_1$-$Q_4$, a secondary side which includes secondary side rectifying devices $SR_1$-$SR_2$, a transformer 102 coupling the primary side switching devices $Q_1$-$Q_4$ to the secondary side rectifying devices $SR_1$-$SR_2$, and a controller 104 for controlling operation of the converter 100.

The flux limited fast transient response techniques described herein control the switching of the primary side switching devices $Q_1$-$Q_4$, and indirectly control the secondary side rectifying devices $SR_1$-$SR_2$ as the secondary side rectifying device control signals are generated as a function of the primary side switching device control signals. The secondary side rectifying devices $SR_1$-$SR_2$ are shown as transistor switching devices in FIG. 1, but instead may be implemented as diodes which have no synchronous rectification (SR) control signals. If the secondary side rectifying devices $SR_1$-$SR_2$ are implemented as transistor switch devices, the secondary side rectifying devices $SR_1$-$SR_2$ follow the corresponding switches on primary side.

In either configuration, an input power source $V_{in}$ provides power to the isolated DC-DC voltage converter 100 and the converter 100 supplies output power to a load which is generically represented as a resistor $R_L$. The input power source $V_{in}$ is provided to the primary side of the converter 100, which couples it to the transformer 102 using the primary side switching devices $Q_1$-$Q_4$. Each of the primary side switching devices $Q_1$-$Q_4$ has an associated driver within a driver stage. The driver stage and related driver circuitry are not illustrated for ease of illustration, and any standard driver stage/circuitry may be used. The primary side switching devices $Q_1$-$Q_4$ are oriented in a full-bridge configuration in FIG. 1.

The primary side switching devices $Q_1$, $Q_2$, $Q_3$, $Q_4$ are illustrated in FIG. 1 as enhancement-mode metal-oxide semiconductor field-effect transistors (MOSFETs), but other switch types may be used. For example, junction field-effect transistors (JFETs), bipolar junction transistors (BJTs), insulated gate bipolar transistors (IGBTs), high electron mobility transistors (HEMTs), or other types of power transistors may be preferred in some applications. The primary side switching devices $Q_1$, $Q_2$, $Q_3$, $Q_4$ may be integrated on the same semiconductor die, may each be provided on separate dies, or may otherwise be spread across a plurality of semiconductor dies. The corresponding driving circuitry (not shown) may be integrated on the same semiconductor die(s) as their corresponding primary side switching devices $Q_1$, $Q_2$, $Q_3$, $Q_4$, or may be provided on separate dies.

The transformer 102 has a primary winding P with N1 turns, secondary windings S1, S2 with N2 turns each, and a core 106. The transformer 120 of FIG. 1 also includes a leakage inductance, which is not a separate component but which models stray inductance that is not included in the windings P, S1, S2. The secondary windings S1, S2 are connected together at a center tap in FIG. 1. A rectified voltage node is coupled to this center tap. Presuming the effect of the leakage inductance to be insignificant, the ratio N2/N1 determines the ratio of the rectified voltage $V_{rect}$ to the input voltage $V_{AB}$ of the transformer 102.

Operation of the isolated DC-DC voltage converter 100 is described next in more detail during both non-transient and transient load conditions. A non-transient load condition means that the load current remains relatively unchanged, whereas a transient load condition means that an instantaneous or near instantaneous change in load current has occurred. The controller 104 is equipped to operate in both a non-transient mode during which the load current remains relatively unchanged, and in a transient mode during which instantaneous or near instantaneous changes in load current occur.

In general, the controller 104 is responsible for controlling the primary side switching devices $Q_1$-$Q_4$ and the secondary side rectifying devices $SR_1$ and $SR_2$ (if implemented as transistors) so as to supply the necessary power (voltage $V_O$ and current $I_L$) to the load. This includes generating PWM waveforms that control the primary side switching devices $Q_1$-$Q_4$ and also the secondary side rectifying devices $SR_1$ and $SR_2$ (if implemented as transistors). The PWM waveforms that control the primary side switching devices $Q_1$-$Q_4$ and the secondary side rectifying devices $SR_1$ and $SR_2$ (if implemented as transistors) are generated to ensure that the load is supplied adequate power, and this generation is typically based upon the output voltage $V_O$ and/or the load current $I_L$. Conventional techniques are used to generate baseline PWM waveforms, based upon load requirements.

For example, a proportional, integral and derivative (PID) controller 108 included in or associated with the main controller 104 may use the output voltage $V_O$ to adaptively determine duty cycle. A digital pulse width modulator (DPWM) 110 may use the duty cycle information provided by the PID controller 108 to generate the PWM waveforms that control switching of the primary side switching devices $Q_1$-$Q_4$ and the secondary side rectifying devices $SR_1$ and $SR_2$ (if implemented as transistors). Because such techniques are well-known, they will not be described further herein. Instead, the following description focuses on the unique aspects of this invention, which are directed to techniques for modifying the PWM waveforms in order to prevent saturation of the transformer core 106 during transient load conditions. To this end, the controller 104 includes a transient auxiliary control and protection unit 112 for implementing the transformer core saturation avoidance techniques described herein.

The controller 104 and its constituent parts may be implemented using a combination of analog hardware components (such as transistors, amplifiers, diodes, and resistors), and processor circuitry that includes primarily digital components. The processor circuitry may include one or more of a digital signal processor (DSP), a general-purpose processor, and an application-specific integrated circuit (ASIC). The controller 104 may also include memory, e.g., non-volatile memory such as flash, that includes instructions or data for use by the processor circuitry, and one or more timers. The controller 104 inputs sensor signals such as signals corresponding to $V_O$ and $I_L$.

Figure 2:
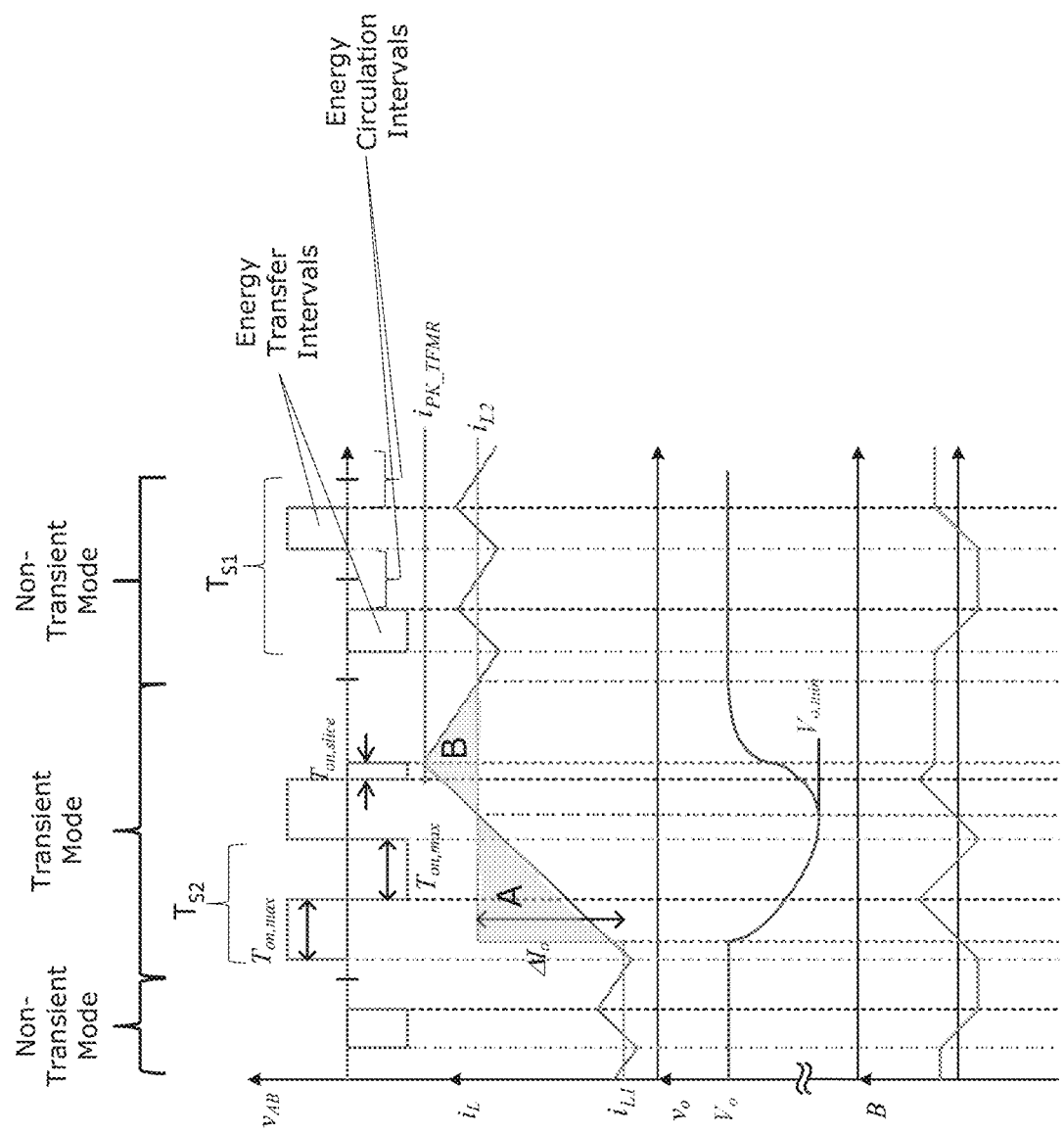
FIG. 2 illustrates waveforms associated with operation of the isolated DC-DC voltage converter in both non-transient and transient modes.

Detailed operation of the isolated DC-DC voltage converter 100 is described next with reference to FIG. 2. FIG. 2 illustrates various waveforms associated with operation of the converter 100 in both the non-transient and transient modes. These waveforms include voltage $V_{AB}$ across the primary winding P of the transformer 102, current $i_L$ in the output inductor $L_O$ of the converter 100, voltage $V_O$ across the output capacitor Co of the converter 100, and magnetic flux density B of the transformer core 106. FIG. 2 also shows a transient load condition in which the load current changes from a first (lower) target value $i_{L1}$ to a second (higher) target value $i_{L2}$ and the corresponding difference $\Delta I_O$. During this transition in the target current, the controller 104 operates in the transient mode. Before and after the transition, the controller 104 operates in the non-transient mode.

Non-Transient Mode

During an energy transfer interval within a positive half-cycle of the input power source $V_{in}$, primary side switching devices $Q_1$ and $Q_3$ are conducting via respective PWM signals, thereby producing a positive voltage $+V_{AB}$ across the primary winding P of the transformer 102. During an energy transfer interval within a negative half-cycle of the input power source $V_{in}$, primary side switching devices $Q_2$ and $Q_4$ are conducting via respective PWM signals, thereby providing a negative voltage $-V_{AB}$ across the primary winding P of the transformer 102. Energy circulation intervals occur between successive energy transfer intervals. For PWM control, a so-called dead time occurs during the energy circulation intervals in which none of the primary side switching devices $Q_1$, $Q_2$, $Q_3$, $Q_4$ are conducting and no voltage is provided across the primary winding P of the transformer 102. Current does not flow in the primary side during energy circulation intervals under PWM control, only in the secondary side. For phase shift modulation (PSM) control, primary side switching devices $Q_1$ and $Q_2$ conduct circulating current; or primary side switching devices $Q_3$ and $Q_4$ conduct circulating current during energy circulation intervals. As such, current circulates in both the primary and secondary sides during energy circulation intervals under PSM control. The operational details of the isolated DC-DC voltage converter 100 are described herein in the context of PWM control for ease and simplicity of explanation. However, those skilled in the art will readily understand that the techniques described herein equally apply to PSM control.

With a standard PWM-based approach, the controller 104 switches the primary side switching devices $Q_1$, $Q_2$, $Q_3$, $Q_4$ at a fixed (constant) first switching period $T_{S1}$ and variable duty cycle D during non-transient load conditions so as to transfer energy across the transformer 102 during first (non-transient mode) energy transfer intervals which are separated by energy circulation intervals. The PID controller 108 determines the variable duty such that the ratio of each energy transfer interval $T_{energyTx}$ to the fixed switching period $T_{S1}$ is less than unity i.e. $T_{energyTx}/T_{S1} < 1$. Accordingly, as shown in FIG. 2, ample dead time is provided between energy transfer intervals so as to allow the controller 104 to react to a transient load condition.

Transient Mode

During a transient load condition, the controller 104 switches the primary side switching devices $Q_1$, $Q_2$, $Q_3$, $Q_4$ of the isolated DC-DC voltage converter at a second (transient mode) switching period $T_{S2}$ different than the first (non-transient mode) switching period $T_{S1}$ so as to transfer energy across the transformer 102 during second (transient mode) energy transfer intervals of a duration $T_{on,max}$, and such that any energy circulation interval separating the transient mode energy transfer intervals is shorter than the energy circulation intervals separating the non-transient mode energy transfer intervals. The transient mode switching period $T_{S2}$ may be greater than or less than the non-transient mode switching period $T_{S1}$. If the transient mode switching period $T_{S2}$ is less than the non-transient mode switching period $T_{S1}$, the primary side switching devices $Q_1$, $Q_2$, $Q_3$, $Q_4$ are switched at a higher switching frequency in the transient mode than in the non-transient mode.

The controller 104 may detect a transient load condition e.g. based on $V_O$ and/or $I_L$. In response to a transient load condition, the controller 104 determines the transient mode switching period $T_{S2}$ based on the duration $T_{on,max}$ of the energy transfer intervals in the transient mode which correspond to the width of the ON time pulses applied to the primary side switching devices $Q_1$, $Q_2$, $Q_3$, $Q_4$ of the isolated DC-DC voltage converter. The duration $T_{on,max}$ of the transient mode energy transfer intervals is determined so as to avoid saturation of the transformer core 106. If the transient mode energy transfer intervals were to exceed $T_{on,max}$, the magnetic flux density B in the transformer core 106 would increase/decrease to its positive/negative saturation limit.

The input voltage $V_{in}$ effects the slew rate of the magnetic flux density in the transformer core 106. An increase in $V_{in}$ correspondingly increases the slew rate of the magnetic flux density. The controller 104 may adjust the duration $T_{on,max}$ of the energy transfer intervals in the transient mode accordingly. For example, higher $V_{in}$ translates to narrower $T_{on,max}$ pulses in the transient mode. By adjusting the duration $T_{on,max}$ of the energy transfer intervals in the transient mode based on a new input voltage magnitude for the isolated DC-DC converter 100, saturation of the transformer core 106 may be avoided for the new input voltage magnitude during the transient load condition. Because the switching period $T_{S2}$ for the transient mode is derived from $T_{on,max}$ as described herein, the controller 104 also adjusts $T_{S2}$ based on the newly determined duration of the transient mode energy transfer intervals.

Various embodiments for determining $T_{on,max}$ are described in detail later herein. Switching period $T_{S1}$ is determined in a wholly different manner in the non-transient mode. In the non-transient mode, switching period $T_{S1}$ is fixed (constant) and determined based on various system parameters. The variable duty cycle of the PWM signals applied to the primary side switching devices $Q_1$, $Q_2$, $Q_3$, $Q_4$ during the non-transient mode is determined based on e.g. the output voltage $V_O$ and the switching frequency. As such, frequency is not used to provide regulation on the output in the non-transient mode, but switching frequency will change in the transient mode so that the necessary energy transfer is provided for the output inductor $L_O$.

The variable duty cycle (D) and ON time of the primary side switching devices $Q_1$, $Q_2$, $Q_3$, $Q_4$ are related by switching period in the non-transient mode as given by Ton=D*$T_{s1}$. The maximum duty cycle Dmax may be set by the user, e.g. based on transformer saturation (V/sec) limits.

In the transient mode, the maximum duty cycle Dmax translates to a duration $T_{on,max}$ which avoids saturation of the transformer core 106 with excessive V/seconds. The transient auxiliary control and protection unit 112 included in or associated with the controller 104 uses the duration $T_{on,max}$ of the ON time pulses applied to the primary side switching devices $Q_1$, $Q_2$, $Q_3$, $Q_4$ to determine switching period $T_{S2}$ used in the transient mode. Ideally, the transient auxiliary control and protection unit 112 sets the transient mode switching period $T_{S2}$ equal to twice the duration of the transient mode energy transfer intervals i.e. $T_{S2}=2*T_{on,max}$ as shown in FIG. 2. In this configuration, there is no dead time between the positive and negative half cycles of the voltage $V_{AB}$ applied to the primary coil P of the transformer 102. In a non-ideal setting, the transient mode switching period $T_{S2}$ may be set equal to twice the duration $T_{on,max}$ of the transient mode energy transfer intervals plus dead time i.e. $T_{S2}=2*T_{on,max}+2$ energy circulation intervals so as to ensure proper operation of the primary side switching devices $Q_1$, $Q_2$, $Q_3$, $Q_4$.

In either case, there is little to no dead time between the positive and negative half cycles of the transformer primary coil voltage $V_{AB}$ in transient mode as compared to non-transient mode. As a result, a constant or nearly constant voltage is applied across the output inductor $L_O$ of the isolated DC-DC voltage converter 100 and the inductor ramp current $I_L$ ramps up in a linear or mostly linear manner. A square-wave for the voltage $V_{AB}$ across the primary coil P of the transformer 102 yields a constant ramp of the inductor current $i_L$ as represented by the following equations:

$$di_L/dt=(V_{rect}-V_o)/L, \quad (1)$$

$$V_{rect}=V_{in}/N \text{(full-bridge)}, \quad (2)$$

$$V_{rect}=V_{in}/2/N \text{(half-bridge)} \quad (3)$$

where $V_{rect}$ is the rectified voltage on the secondary side of the isolated DC-DC voltage converter 100.

The inductor current $i_L$ increases linearly or nearly linearly in the transient mode until a peak current value $i_{PK\_TFMR}$ of the transformer 102 is reached. The controller 104 may monitor the inductor current $i_L$ and compare the monitored inductor current to a predetermined threshold to determine when the peak current value $i_{PK\_TFMR}$ of the transformer 102 is reached. The peak current value $i_{PK\_TFMR}$ of the transformer 102 may be determined based on the input voltage $V_{in}$, load step $\Delta I_O$ and output inductor, and is set so that area A and area B in FIG. 2 are ideally equal or nearly equal. Various techniques are well known in the voltage converter arts for measuring output voltage and inductor current, and therefore no further explanation is provided.

Described next are embodiments directed to exiting the transient mode and re-entering the non-transient mode.
Exiting Non-Transient Mode The controller 104 continues to operate in the transient mode when the peak current value $i_{PK\_TFMR}$ of the transformer 102 is reached, but prevents switching of the primary side switching devices $Q_1$, $Q_2$, $Q_3$, $Q_4$ at the transient mode switching period $T_{S2}$ so that current in the output inductor $L_O$ begins to drop. In one embodiment, the controller 104 truncates the duration $T_{on,max}$ of the transient mode energy transfer interval being applied to the transformer to $T_{on,slice}$ when the peak current value $i_{PK\_TFMR}$ of the transformer 102 is reached. This is shown in FIG. 2, where the last energy transfer interval in the transient mode is illustrated as a truncated or shortened negative square wave voltage $V_{AB}$ across the primary winding P of the transformer 102.

After the current in the output inductor $L_O$ drops to the new target value $i_{L2}$, the output voltage $V_O$ comes into regulation again and the controller 104 re-enters the non-transient mode. In the non-transient mode, the controller 104 resumes switching of the primary side switching devices $Q_1$, $Q_2$, $Q_3$, $Q_4$ at the non-transient mode switching period Ts, as illustrated in FIG. 2.

Figure 3:
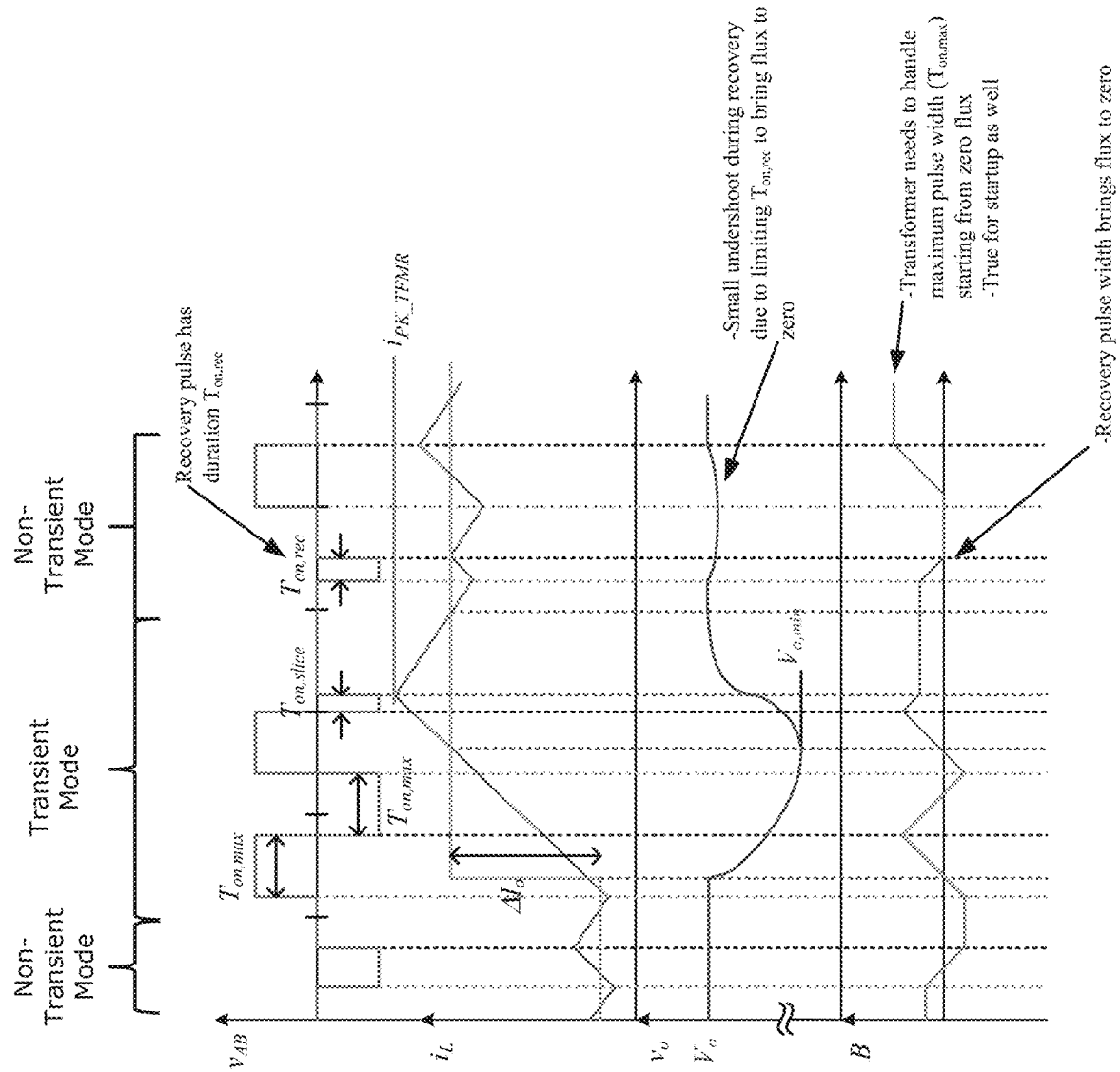
FIG. 3 illustrates waveforms associated with an embodiment of exiting the transient mode.

FIG. 3 illustrates an embodiment in which the controller 104 attempts to bring the magnetic flux density within the transformer core 106 to zero or near zero before resuming switching of the primary side switching devices $Q_1$, $Q_2$, $Q_3$, $Q_4$ at the non-transient mode switching period $T_{S1}$. The transformer core 106 must be capable of handling the width of the voltage pulse applied to the primary coil P of the transformer 102 during the first full energy transfer interval at the non-transient mode switching period $T_{S1}$. To this end, the controller 104 applies a recovery pulse to one pair of the primary side switching devices $Q_1$, $Q_2$, $Q_3$, $Q_4$ after the peak current value $i_{PK\_TFMR}$ of the transformer 102 is reached and prior to resuming switching of the primary side switching devices $Q_1$, $Q_2$, $Q_3$, $Q_4$ at the non-transient mode switching period $T_{S1}$. The duration $T_{on,rec}$ of the recovery pulse is sufficient to bring the magnetic flux density within the transformer core 106 to zero or near zero.

In one embodiment, the recovery pulse has the same duration $T_{on,max}$ as the energy transfer intervals in the transient mode. With this approach, the output voltage $V_O$ may have slight undershoot since the recovery pulse brings magnetic flux density of the transformer core 106 to zero or near zero and therefore may not be sufficient to support the load.

In another embodiment, the duration $T_{on,rec}$ of the recovery pulse is determined based on magnetic flux density measurements for the transformer core 106. The controller 104 uses the magnetic flux density measurements to bring the magnetic flux in the transformer core 106 to zero or near zero just prior to resuming switching of the primary side switching devices $Q_1$, $Q_2$, $Q_3$, $Q_4$ at the non-transient mode switching period $T_{S1}$. The transient mode of operation may introduce a limited non-zero average to the magnetic flux density. Calculation of the duration $T_{on,rec}$ of the recovery pulse is greatly simplified in this embodiment, since magnetic flux density of the transformer core 106 is known by the flux density measurements.

Figure 4:
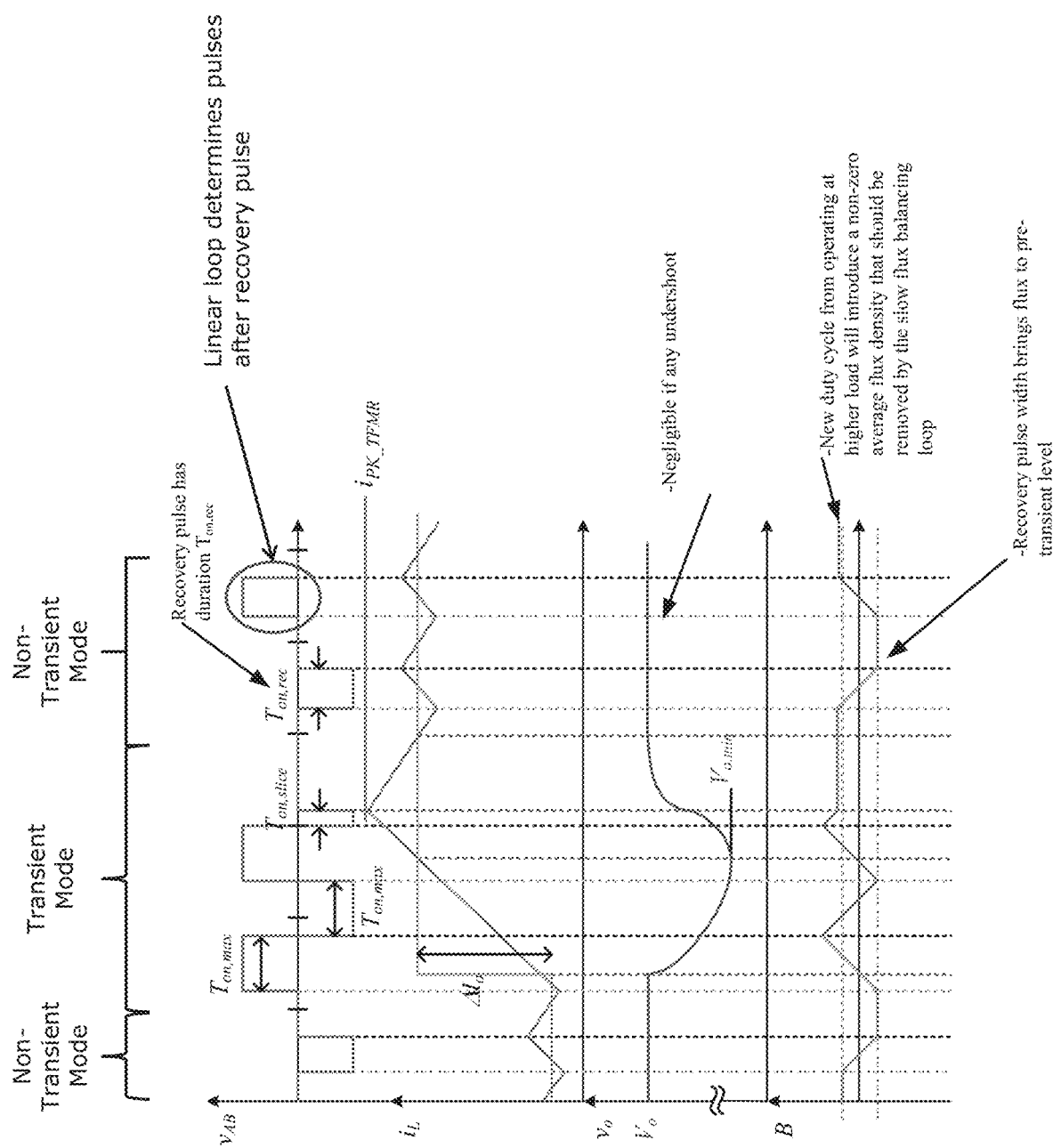
FIG. 4 illustrates waveforms associated with another embodiment of exiting the transient mode.

FIG. 4 illustrates yet another embodiment in which the final energy transfer interval in the transient mode is truncated so as to have a duration $T_{on,slice}$ during the transient load event as previously explained herein in connection with FIG. 2. This way, the final energy transfer interval during the transient load condition has a shorter duration $T_{on,slice}$ than the duration $T_{on,max}$ of the other transient mode energy transfer intervals. According to the recovery pulse embodiment illustrated in FIG. 4, the controller 104 sets the duration $T_{on,rec}$ of the recovery pulse to the difference between the duration of the final energy transfer interval in the transient mode minus the duration of the other transient mode energy transfer intervals i.e. $T_{on,rec}=T_{on,max}-T_{on,slice}$. Subsequent pulses in the non-transient mode may be determined by a standard linear feedback loop and a standard slow flux balancing loop.

Figure 5:
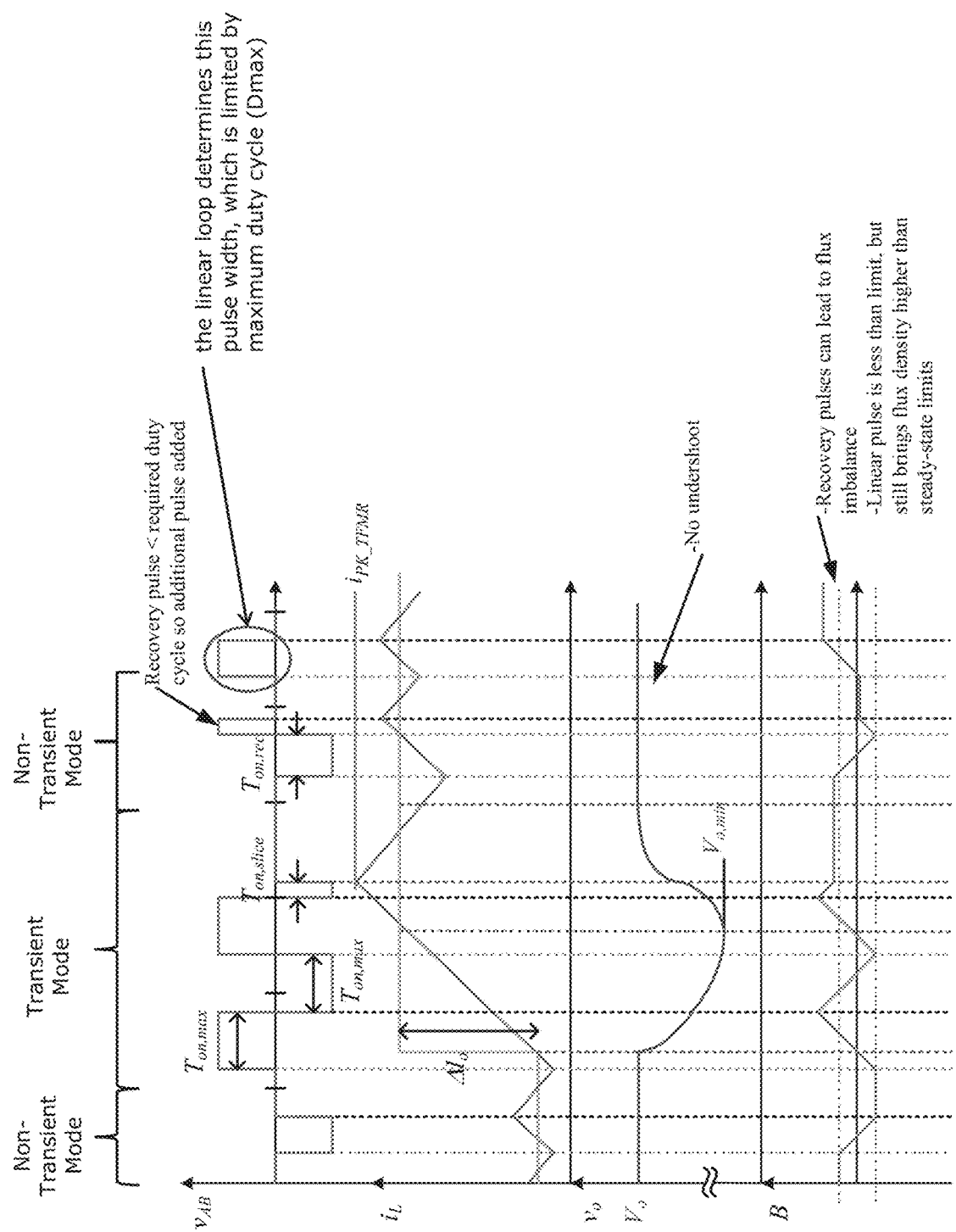
FIG. 5 illustrates waveforms associated with yet another embodiment of exiting the transient mode.

FIG. 5 illustrates yet another embodiment in which the first recovery pulse, limited by maximum on-time $T_{on,max}$, may not be sufficient to balance the magnetic flux in the transformer core 106. According to this embodiment, the controller 104 applies a second (additional) recovery pulse to the opposite pair of primary side switching devices as the first (initial) recovery pulse. The second recovery pulse is narrower than the first recovery pulse. For example, the duration of the second pulse may be $D*T_{s2}/2-T_{on,rec}$. In FIG. 5, a standard linear control loop takes over in the non-transient mode but the magnetic flux density of the transformer core 106 rises. The controller 104 may implement an additional non-linear flip-flop type pulse to drive the flux to a balanced state. A standard slow loop could be used to gradually force the non-linear flip-flop pulses to converge to linear operation.

Described next are embodiments directed to entering the transient mode from the non-transient mode.

Entering Transient Mode

The transient auxiliary control and protection unit 112 included in or associated with the controller 104 selects the source of the signals to be applied to the gates of the primary side switching devices $Q_1$-$Q_4$ and the secondary side rectifying devices $SR_1$ and $SR_2$ (if implemented as transistors). The selection is based on an error signal. The error signal may correspond to the difference between a reference voltage $V_{ref}$ and the output voltage $V_O$ as shown in FIG. 1. The selections may be based on one or more of error magnitude, derivative of the error, length of time that an error magnitude exists, etc.

Figure 6:
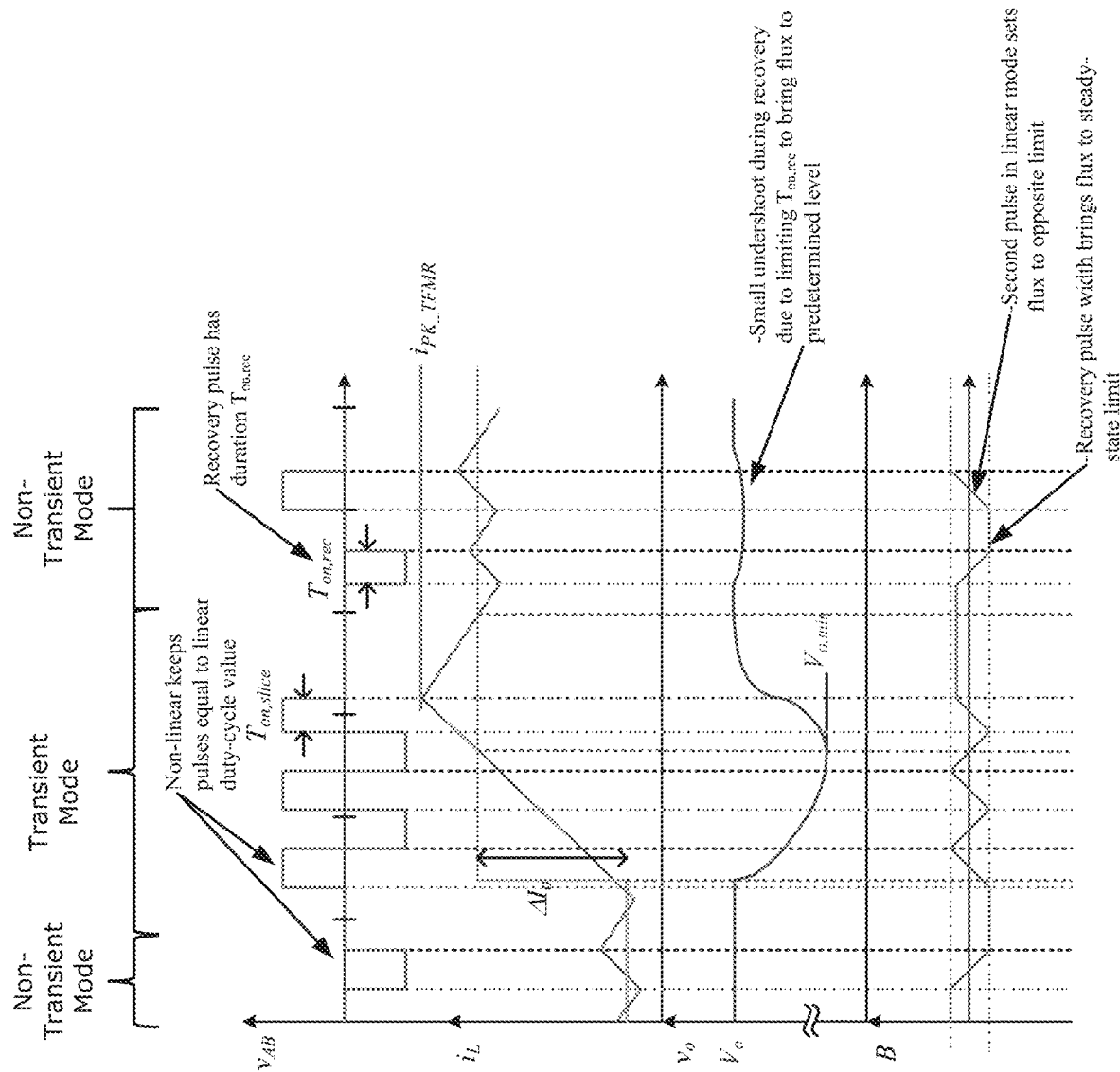
FIG. 6 illustrates waveforms associated with an embodiment of entering the transient mode.

FIG. 6 illustrates an embodiment of entering the transient mode, in which the controller 104 determines the duration $T_{on,max}$ of the energy transfer intervals in the transient mode based on the last known duty cycle of the energy transfer intervals in the non-transient mode just prior to the transient load condition. According to this embodiment, the pulses applied to the gates of the primary side switching devices $Q_1$-$Q_4$ and the secondary side rectifying devices $SR_1$ and $SR_2$ (if implemented as transistors) in the transient mode have the same duration (width) as the pulses applied in the non-transient mode just prior to the transient load condition. This method operates at the highest switching frequency in the transient mode.

Figure 7:
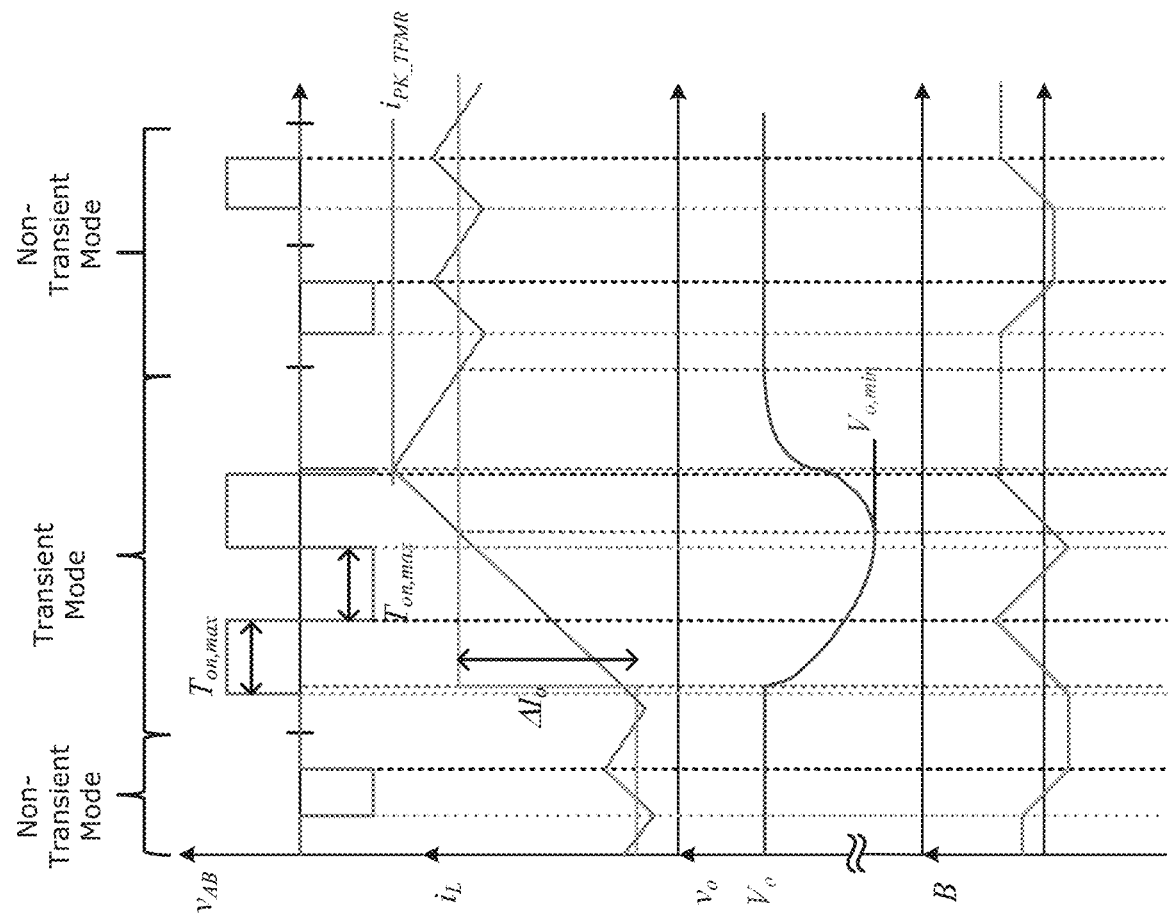
FIG. 7 illustrates waveforms associated with another embodiment of entering the transient mode.

FIG. 7 illustrates another embodiment of entering the transient mode, in which the controller 104 sets the duration $T_{on,max}$ of the transient mode energy transfer intervals to a pre-programmed value that avoids saturation of the transformer core 106 during the transient load condition. According to this embodiment, the controller 104 uses a maximum duty cycle in the transient mode that avoids saturation of the transformer core 106. The magnetic flux in the transformer core 106 will increase beyond a steady-state value, but may be limited to what a standard linear loop would experience with duty cycle limitations in the non-transient mode.

Figure 8:
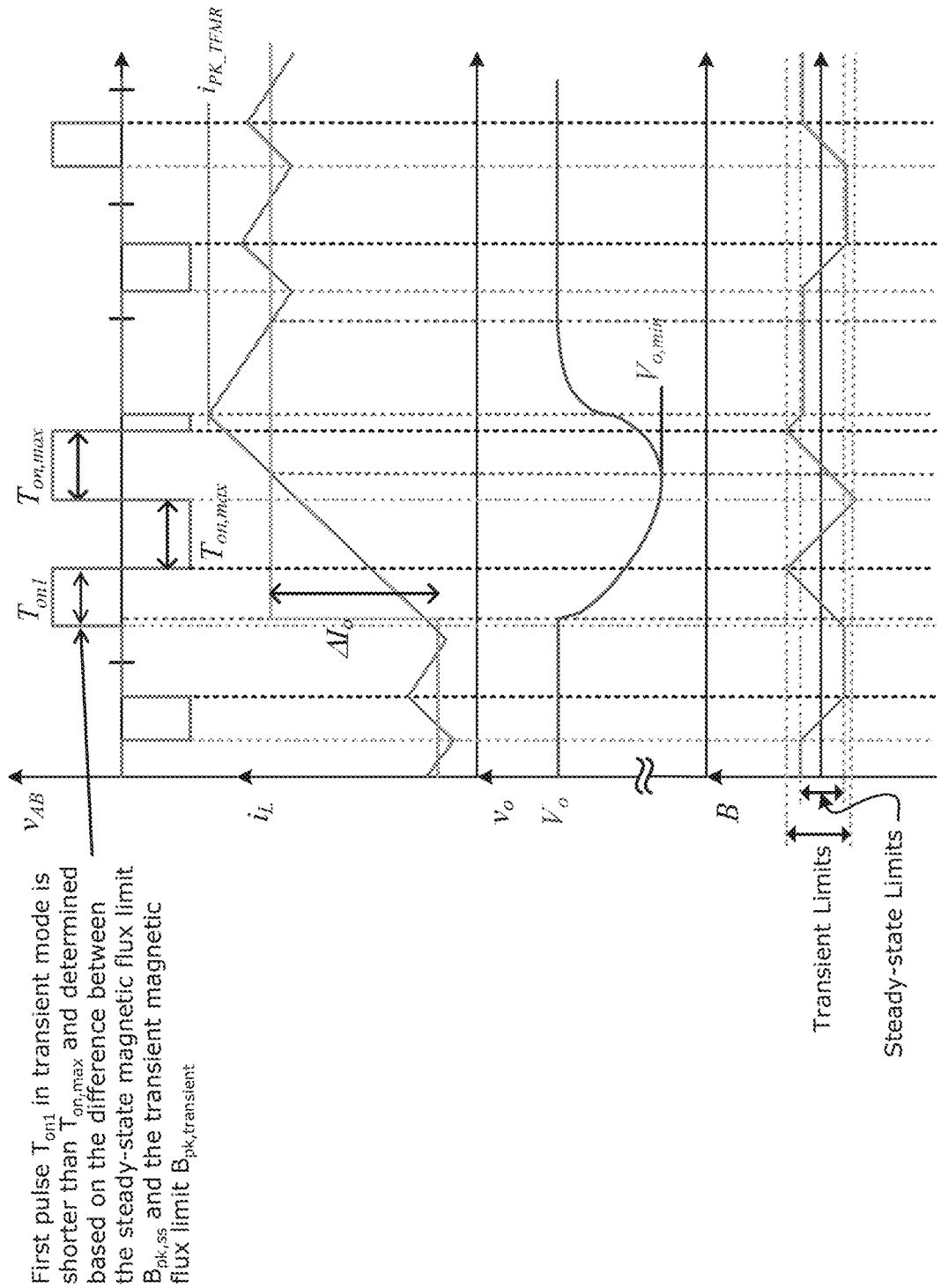
FIG. 8 illustrates waveforms associated with yet another embodiment of entering the transient mode.

FIG. 8 illustrates yet another embodiment of entering the transient mode. According to this embodiment, the controller 104 increases the duration of at least one of the transient mode energy transfer intervals so as to achieve zero or near-zero average magnetic flux density in the transformer core 106. For example, the controller 104 may gradually increase the duration of the energy transfer intervals in the transient mode. In one embodiment, the controller 104 sets the duration $T_{on1}$ of the initial transient mode energy transfer interval, which occurs at the beginning of the transient load condition, based on the last known duty cycle $T_{on,ss}$ of the energy transfer interval in the non-transient mode just prior to the transient load condition as given by:

$$T_{on1} = T_{on,ss} + T_{on} \quad (4)$$

where $\Delta T_{on}$ is the additional on-time needed to move the magnetic flux density in the transformer core 106 from a steady-state limit $B_{pk,ss}$ to a transient limit $B_{pk,transient}$. This way, a more relaxed magnetic flux density limit may be applied in the transient mode as compared to the non-transient mode. The controller 104 may set the duration $T_{on,max}$ of subsequent ones of the energy transfer intervals in the transient mode to a pre-programmed value which is greater than the duration $T_{on1}$ of the initial transient mode energy transfer interval, and which avoids saturation of the transformer core 106. As explained above, the pre-programmed value may be determined so as to avoid transformer core saturation at the transient limit $B_{pk,transient}$ instead of the more stringent steady-state limit $B_{pk,ss}$.

According to another embodiment, the controller 104 truncates the duration of the initial transient mode energy transfer interval at the beginning of the transient load condition so as to avoid saturation of the transformer core 106 when the isolated DC-DC voltage converter 100 begins responding to the transient load condition. This approach applies regardless of whether a relaxed transformer core saturation limit $B_{pk,transient}$ is permitted in the transient mode.

According to still another embodiment, the controller 104 determines the duration $T_{on,max}$ of the energy transfer intervals in the transient mode based on magnetic flux density measurements of the transformer core 106. This approach yields positive half cycle energy transfer intervals in the transient mode that are terminated when the positive flux density limit for the transformer core 106 is reached as indicated by the magnetic flux density measurements, and negative half cycle energy transfer intervals that are terminated when the negative flux density limit for the transformer core 106 is reached as indicated by the magnetic flux density measurements.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of controlling an isolated DC-DC converter that includes primary side switching devices coupled to secondary side rectifying devices by a transformer having a core, the method comprising:

switching the primary side switching devices at a fixed first switching period and variable duty cycle during non-transient load conditions so as to transfer energy across the transformer during first energy transfer intervals separated by energy circulation intervals, such that the ratio of each first energy transfer interval to the first switching period is less than unity;

switching the primary side switching devices at a second switching period different than the first switching period during a transient load condition so as to transfer energy across the transformer during second energy transfer intervals of a duration determined so as to avoid saturation of the transformer core, and such that any energy circulation interval separating the second energy transfer intervals is shorter than the energy circulation intervals separating the first energy transfer intervals;

adjusting the duration of the second energy transfer intervals based on a new input voltage magnitude for the isolated DC-DC converter, so as to avoid saturation of the transformer core for the new input voltage magnitude during the transient load condition; and adjusting the second switching period based on the adjusted duration of the second energy transfer intervals.

2. The method of claim 1, wherein the second switching period is less than the first switching period.

3. The method of claim 1, wherein the second switching period is set equal to twice the duration of the second energy transfer intervals.

4. The method of claim 1, wherein the second switching period is set equal to twice the duration of the second energy transfer intervals plus dead time.

5. The method of claim 1, further comprising:
truncating the duration of the second energy transfer interval being applied when a peak current value of the transformer is reached.

6. The method of claim 1, further comprising:
increasing the duration of at least one of the second energy transfer intervals, so as to achieve zero or near-zero average magnetic flux density in the transformer core.

7. The method of claim 6, wherein increasing the duration of at least one of the second energy transfer intervals comprises:
setting the duration of an initial one of the second energy transfer intervals at the beginning of the transient load condition, based on the last known duty cycle of the first energy transfer intervals just prior to the transient load condition; and
setting the duration of subsequent ones of the second energy transfer intervals to a pre-programmed value which is greater than the duration of the initial second energy transfer interval and which avoids saturation of the transformer core.

8. The method of claim 1, further comprising:
preventing switching of the primary side switching devices at the second switching period after a peak current value of the transformer is reached, so that current in an output inductor of the isolated DC-DC converter begins to drop; and
resuming switching of the primary side switching devices at the first switching period after the current in the output inductor drops to a predetermined limit.

9. The method of claim 8, further comprising:
applying a first recovery pulse to one of the primary side switching devices after the peak current value is reached and prior to resuming switching of the primary side switching devices at the first switching period.

10. The method of claim 9, wherein the first recovery pulse has the same duration as the second energy transfer intervals.

11. The method of claim 9, further comprising:
determining the duration of the first recovery pulse based on magnetic flux density measurements taken for the transformer core, so as to bring the magnetic flux in the transformer core to zero or near zero just prior to resuming switching of the primary side switching devices at the first switching period.

12. The method of claim 9, further comprising:
truncating a final one of the second energy transfer intervals during the transient load event, so that the final second energy transfer interval during the transient load condition has a shorter duration than the other second energy transfer intervals; and
setting the duration of the first recovery pulse to the duration of the final second energy transfer interval plus the duration of the other second energy transfer intervals.

13. The method of claim 9, further comprising:
applying a second recovery pulse to the opposite primary side switching device as the first recovery pulse, the second recovery pulse being narrower than the first recovery pulse.

14. The method of claim 1, further comprising:
determining the duration of the second energy transfer intervals based on the last known duty cycle of the first energy transfer intervals just prior to the transient load condition.

15. The method of claim 1, further comprising:
setting the duration of the second energy transfer intervals to a pre-programmed value that avoids saturation of the transformer core during the transient load condition.

16. The method of claim 1, further comprising:
determining the duration of the second energy transfer intervals based on magnetic flux density measurements taken for the transformer core.

17. The method of claim 1, further comprising:
truncating an initial one of the second energy transfer intervals at the beginning of the transient load condition, so as to avoid saturation of the transformer core when the isolated DC-DC converter begins responding to the transient load condition.

18. The method of claim 1, wherein the duration of the second energy transfer intervals is based on a magnetic flux limit that is less stringent than a magnetic flux limit applied when the primary side switching devices are being switched at the first switching period.

19. An isolated DC-DC converter, comprising:
primary side switching devices;
secondary side rectifying devices;
a transformer having a core, the transformer coupling the primary side switching devices to the secondary side rectifying devices; and
a controller operable to:
switch the primary side switching devices at a fixed first switching period and variable duty cycle during non-transient load conditions so as to transfer energy across the transformer during first energy transfer intervals separated by energy circulation intervals, such that the ratio of each first energy transfer interval to the first switching period is less than unity;
switch the primary side switching devices at a second switching period different than the first switching period during a transient load condition so as to transfer energy across the transformer during second energy transfer intervals of a duration determined so as to avoid saturation of the transformer core, and such that any energy circulation interval separating the second energy transfer intervals is shorter than the energy circulation intervals separating the first energy transfer intervals;
adjust the duration of the second energy transfer intervals based on a new input voltage magnitude for the isolated DC-DC converter, so as to avoid saturation of the transformer core for the new input voltage magnitude during the transient load condition; and adjust the second switching period based on the adjusted duration of the second energy transfer intervals.

20. The isolated DC-DC converter of claim 19, wherein the controller is operable to truncate the duration of the second energy transfer interval being applied when a peak current value of the transformer is reached.

21. The isolated DC-DC converter of claim 19, wherein the controller is operable to increase the duration of at least one of the second energy transfer intervals, so as to achieve zero or near-zero average magnetic flux density in the transformer core.

22. The isolated DC-DC converter of claim 21, wherein the controller is operable to:

set the duration of an initial one of the second energy transfer intervals at the beginning of the transient load condition, based on the last known duty cycle of the first energy transfer intervals just prior to the transient load condition; and set the duration of subsequent ones of the second energy transfer intervals to a pre-programmed value which is greater than the duration of the initial second energy transfer interval and which avoids saturation of the transformer core.

23. The isolated DC-DC converter of claim 19, wherein the controller is operable to:

prevent switching of the primary side switching devices at the second switching period after a peak current value of the transformer is reached, so that current in an output inductor of the isolated DC-DC converter begins to drop; and resume switching of the primary side switching devices at the first switching period after the current in the output inductor drops to a predetermined limit.

24. The isolated DC-DC converter of claim 23, wherein the controller is operable to apply a first recovery pulse to one of the primary side switching devices after the peak current value is reached and prior to resuming switching of the primary side switching devices at the first switching period.

25. The isolated DC-DC converter of claim 24, wherein the controller is operable to determine the duration of the first recovery pulse based on magnetic flux density measurements taken for the transformer core, so as to bring the magnetic flux in the transformer core to zero or near zero just prior to resuming switching of the primary side switching devices at the first switching period.

26. The isolated DC-DC converter of claim 24, wherein the controller is operable to:

truncate a final one of the second energy transfer intervals during the transient load event, so that the final second energy transfer interval during the transient load condition has a shorter duration than the other second energy transfer intervals; and set the duration of the first recovery pulse to the duration of the final second energy transfer interval plus the duration of the other second energy transfer intervals.

27. The isolated DC-DC converter of claim 24, wherein the controller is operable to apply a second recovery pulse to the opposite primary side switching device as the first recovery pulse, the second recovery pulse being narrower than the first recovery pulse.

28. The isolated DC-DC converter of claim 19, wherein the controller is operable to determine the duration of the second energy transfer intervals based on the last known duty cycle of the first energy transfer intervals just prior to the transient load condition.

29. The isolated DC-DC converter of claim 19, wherein the controller is operable to set the duration of the second energy transfer intervals to a pre-programmed value that avoids saturation of the transformer core during the transient load condition.

30. The isolated DC-DC converter of claim 19, wherein the controller is operable to determine the duration of the second energy transfer intervals based on magnetic flux density measurements taken for the transformer core.

31. The isolated DC-DC converter of claim 19, wherein the controller is operable to truncate an initial one of the second energy transfer intervals at the beginning of the transient load condition, so as to avoid saturation of the transformer core when the isolated DC-DC converter begins responding to the transient load condition.

32. The isolated DC-DC converter of claim 19, wherein the controller is operable to determine the duration of the second energy transfer intervals based on a magnetic flux limit that is less stringent than a magnetic flux limit applied when the primary side switching devices are being switched at the first switching period.

33. A method of controlling an isolated DC-DC converter that includes primary side switching devices coupled to secondary side rectifying devices by a transformer having a core, the method comprising:

switching the primary side switching devices at a fixed first switching period and variable duty cycle during non-transient load conditions so as to transfer energy across the transformer during first energy transfer intervals separated by energy circulation intervals, such that the ratio of each first energy transfer interval to the first switching period is less than unity; and switching the primary side switching devices at a second switching period different than the first switching period during a transient load condition so as to transfer energy across the transformer during second energy transfer intervals of a duration determined so as to avoid saturation of the transformer core, and such that any energy circulation interval separating the second energy transfer intervals is shorter than the energy circulation intervals separating the first energy transfer intervals, wherein the method further comprises:

truncating the duration of the second energy transfer interval being applied when a peak current value of the transformer is reached; and/or increasing the duration of at least one of the second energy transfer intervals, so as to achieve zero or near-zero average magnetic flux density in the transformer core.

34. The method of claim 33, wherein increasing the duration of at least one of the second energy transfer intervals comprises:

setting the duration of an initial one of the second energy transfer intervals at the beginning of the transient load condition, based on the last known duty cycle of the first energy transfer intervals just prior to the transient load condition; and setting the duration of subsequent ones of the second energy transfer intervals to a pre-programmed value which is greater than the duration of the initial second energy transfer interval and which avoids saturation of the transformer core.

35. A method of controlling an isolated DC-DC converter that includes primary side switching devices coupled to secondary side rectifying devices by a transformer having a core, the method comprising:
- switching the primary side switching devices at a fixed first switching period and variable duty cycle during non-transient load conditions so as to transfer energy across the transformer during first energy transfer intervals separated by energy circulation intervals, such that the ratio of each first energy transfer interval to the first switching period is less than unity;
- switching the primary side switching devices at a second switching period different than the first switching period during a transient load condition so as to transfer energy across the transformer during second energy transfer intervals of a duration determined so as to avoid saturation of the transformer core, and such that any energy circulation interval separating the second energy transfer intervals is shorter than the energy circulation intervals separating the first energy transfer intervals;
- preventing switching of the primary side switching devices at the second switching period after a peak current value of the transformer is reached, so that current in an output inductor of the isolated DC-DC converter begins to drop; and
- resuming switching of the primary side switching devices at the first switching period after the current in the output inductor drops to a predetermined limit.

36. The method of claim 35, further comprising:
applying a first recovery pulse to one of the primary side switching devices after the peak current value is reached and prior to resuming switching of the primary side switching devices at the first switching period.

37. The method of claim 36, wherein the first recovery pulse has the same duration as the second energy transfer intervals.

38. An isolated DC-DC converter, comprising:
primary side switching devices;
secondary side rectifying devices;
a transformer having a core, the transformer coupling the primary side switching devices to the secondary side rectifying devices; and
a controller operable to:
- switch the primary side switching devices at a fixed first switching period and variable duty cycle during non-transient load conditions so as to transfer energy across the transformer during first energy transfer intervals separated by energy circulation intervals, such that the ratio of each first energy transfer interval to the first switching period is less than unity; and
- switch the primary side switching devices at a second switching period different than the first switching period during a transient load condition so as to transfer energy across the transformer during second energy transfer intervals of a duration determined so as to avoid saturation of the transformer core, and such that any energy circulation interval separating the second energy transfer intervals is shorter than the energy circulation intervals separating the first energy transfer intervals, wherein the controller is further operable to:
- truncate the duration of the second energy transfer interval being applied when a peak current value of the transformer is reached; and/or
- increase the duration of at least one of the second energy transfer intervals, so as to achieve zero or near-zero average magnetic flux density in the transformer core.

39. The isolated DC-DC converter of claim 38, wherein the controller is operable to:
- set the duration of an initial one of the second energy transfer intervals at the beginning of the transient load condition, based on the last known duty cycle of the first energy transfer intervals just prior to the transient load condition; and
- set the duration of subsequent ones of the second energy transfer intervals to a pre-programmed value which is greater than the duration of the initial second energy transfer interval and which avoids saturation of the transformer core.

40. An isolated DC-DC converter, comprising:
primary side switching devices;
secondary side rectifying devices;
a transformer having a core, the transformer coupling the primary side switching devices to the secondary side rectifying devices; and
a controller operable to:
- switch the primary side switching devices at a fixed first switching period and variable duty cycle during non-transient load conditions so as to transfer energy across the transformer during first energy transfer intervals separated by energy circulation intervals, such that the ratio of each first energy transfer interval to the first switching period is less than unity;
- switch the primary side switching devices at a second switching period different than the first switching period during a transient load condition so as to transfer energy across the transformer during second energy transfer intervals of a duration determined so as to avoid saturation of the transformer core, and such that any energy circulation interval separating the second energy transfer intervals is shorter than the energy circulation intervals separating the first energy transfer intervals;
- prevent switching of the primary side switching devices at the second switching period after a peak current value of the transformer is reached, so that current in an output inductor of the isolated DC-DC converter begins to drop; and
- resume switching of the primary side switching devices at the first switching period after the current in the output inductor drops to a predetermined limit.

41. The isolated DC-DC converter of claim 40, wherein the controller is operable to apply a first recovery pulse to one of the primary side switching devices after the peak current value is reached and prior to resuming switching of the primary side switching devices at the first switching period.

* * * * *